Sept. 7, 1948.  H. DICKINSON  2,448,784
THERMAL-MECHANICAL ELEMENT

Filed April 12, 1947  2 Sheets-Sheet 1

INVENTOR
HORACE DICKINSON
BY
ATTORNEY

Sept. 7, 1948.  H. DICKINSON  2,448,784
THERMAL-MECHANICAL ELEMENT

Filed April 12, 1947  2 Sheets-Sheet 2

INVENTOR
HORACE DICKINSON
BY
ATTORNEY

Patented Sept. 7, 1948

2,448,784

UNITED STATES PATENT OFFICE 2,448,784

THERMAL-MECHANICAL ELEMENT

Horace Dickinson, South Gate, Calif.

Application April 12, 1947, Serial No. 741,100

7 Claims. (Cl. 297—14)

This invention relates to a thermal-mechanical element and in particular to a thermal element which is quickly sensitive to slight changes in temperature.

One object of the invention is to provide a thermal-mechanical element which is rapidly responsive to sudden fluctuations in temperature. Another object is to provide a rugged thermostatic element which is rapidly responsive to temperature changes of the surrounding atmosphere. A further object is to provide a thermal-mechanical element in which the relative movements of the parts for slight changes in temperature is amplified to be great enough to directly actuate mechanical trips, electrical switches, and the like.

These and other objects are attained by my invention which will be understood from the following description and the accompanying drawings in which.

Figure 1:
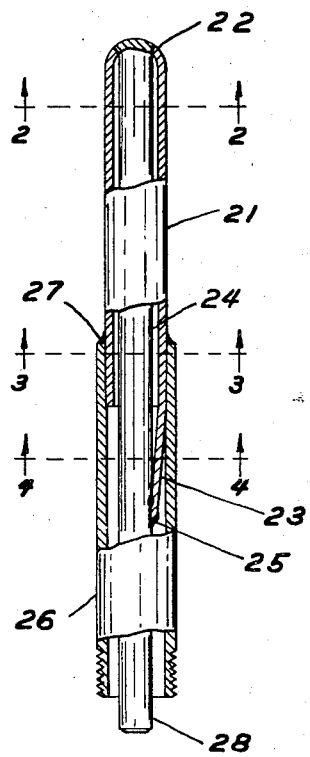
Fig. 1 is a side elevational view with parts broken away and shown in section showing a preferred form of my thermal-mechanical element.
Figure 2:
Fig. 2 is a cross-sectional view taken on the line 2—2 of Fig. 1.
Figure 3:
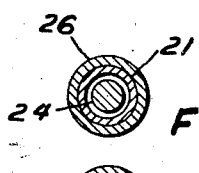
Fig. 3 is a cross-sectional view taken on the line 3—3 of Fig. 1.
Figure 4:
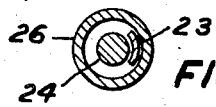
Fig. 4 is a cross-sectional view taken on the line 4—4 of Fig. 1.

Referring to the drawings, particularly Figs. 1 to 5, my thermal-mechanical element consists essentially of an outer tube 21, preferably closed at its outer end 22, and at the opposite end having a large segment of the end portion of the tube removed to leave a relatively narrow segment or tongue 23; which is of length sufficient to give the desired leverage. Within the tube 21 is provided a rod 24 of smaller diameter than the inside of the tube, which rod is welded at the closed end 22 of the tube. The end of the tongue 23 is also welded to the rod 24 at the point 25, the tongue being bent inwardly in contact with the side of the rod. The portion of the tube 21 which is adapted to be subjected to different temperature is the portion adjacent the closed end, termed herein the exposure zone. The element is preferably mounted in a tubular holding member 26 into which the open end of the tube 21 is pressed and securely held by means of brazing or solder 27, the tongue 23 and the rod 24, except the extreme end 28 extending from the open end of the tube 21, being enclosed within the holding member.

The tube 21 and the rod 24 are made of metals having different coefficients of expansion. The tubular holding member 26 is preferably made of high heat-conducting metal such as copper. I prefer to use in the outer tube 21 a stainless steel of the chromium nickel high-expansion type, and in the rod 24, a low-expansion chromium type stainless steel. For example, I have used for the outer tube a stainless steel known as "Type 302" whose expansion coefficient is .0000096 inch per degree Fahrenheit and for the rod a stainless steel known as "Type 416" whose expansion coefficient is .0000056 inch per degree Fahrenheit. When the element is subjected to changes of temperature whether from high temperature to lower or from lower to higher, the end 28 of the rod 24 is moved radially in relation to the tube 21 and the mounting member 26 and this lateral movement is amplified by my arrangement so that it may be used directly to actuate latches, levers, switches, and the like.

Figure 5:
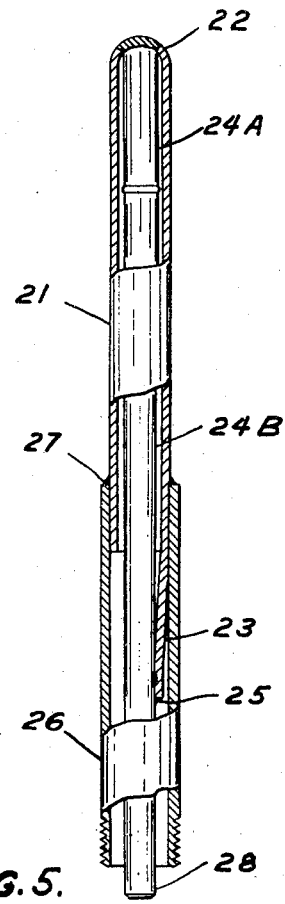
Fig. 5 is a side elevational view with parts broken away and shown in section showing an alternative form of my thermal-mechanical element.

An alternative form of my invention which is particularly adaptable for use where it is necessary to have an unusually long exposure zone consists of a similar arrangement to that described for the preferred form shown in Fig. 1. The alterntaive form is shown in Fig. 5, the principal difference from the preferred form of Fig. 1 being that the rod consists of two portions, 24A adjacent the closed end of the tube 21, and 24B being the remaining portion of the rod. I prefer to make the part 24A of a high thermal expansion metal and the remainder of the rod of a low coefficient of expansion metal. This arrangement gives greater sensitivity to temperature changes as will be later explained.

In another alternative form of my invention, the outer tube 21 is made of a high heat conductive material such as copper, and the rod is composed of invar steel. In this form of my invention, the device may be used as a thermostat element giving quick response to small temperature changes, over a wide range of temperatures.

Figure 6:
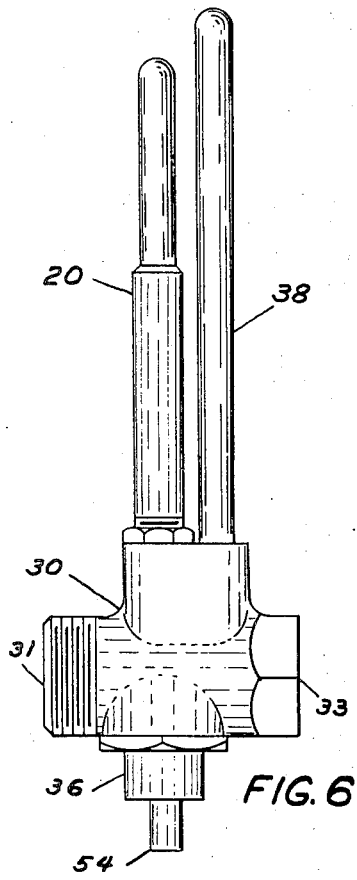
Fig. 6 is a side elevational view showing my thermal-mechanical element as applied to a cutoff valve controlled by a pilot flame.
Figure 7:
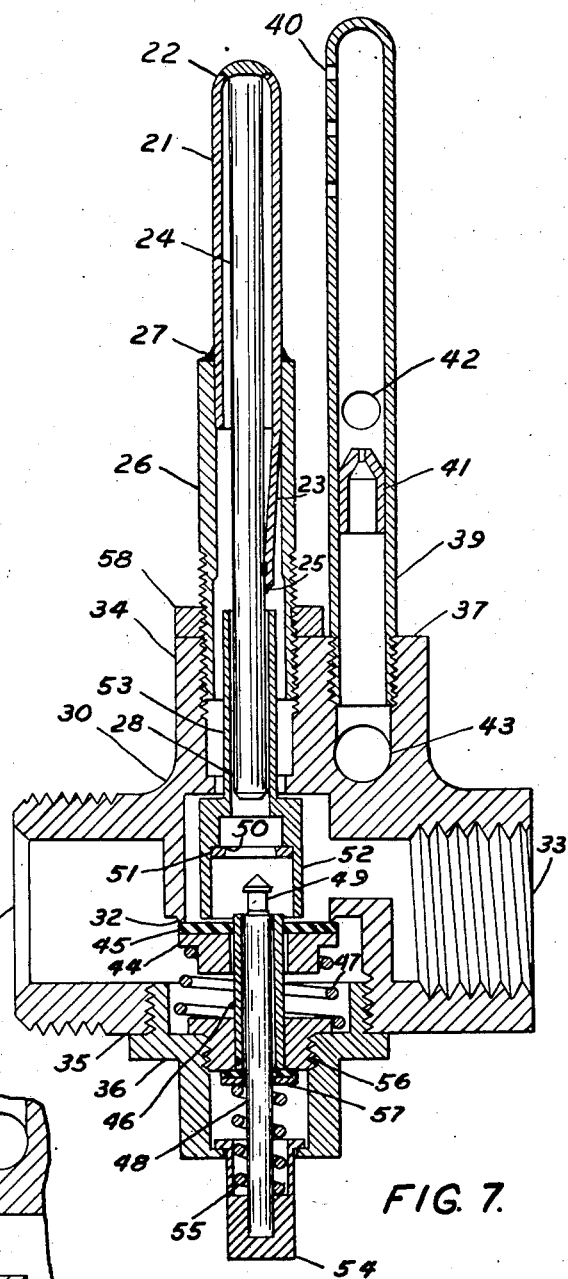
Fig. 7 is a longitudinally cross-sectional view of the valve arrangement shown in Fig. 6.
Figure 8:
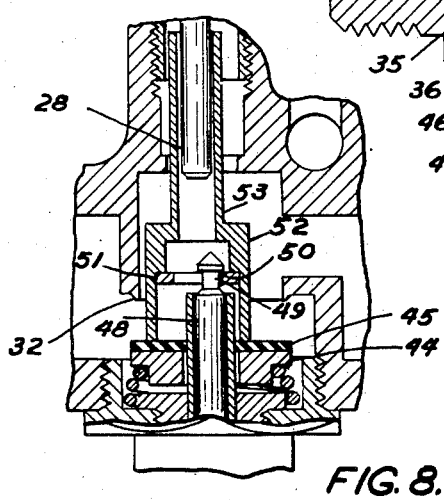
Fig. 8 is a fragmentary cross-sectional view of the valve latching arrangement in open valve position.

Illustrating one application of my thermo-mechanical element I have shown in Figs. 6 to 8, a safety shut-off valve controlled by a pilot flame and arranged so that if the pilot flame is extinguished, the main valve is quickly and automatically closed, and it may not again be opened manually until the thermal-mechanical element has again been heated by the pilot flame. The body 30 of my shut-off valve consists of a gas tight housing having a threaded inlet 31, an annular valve seat 32, a threaded outlet 33, a tapped boss 34 for connection to the threaded end of the thermal-mechanical element holding member 26, a tapped boss 35 for the valve cap 36, and a tapped boss 37 for the pilot burner 38. A lock nut 58 is provided on the threaded end of the tubular holding member 26 at the boss 34 to hold the thermal-mechanical element securely in any angular position. The pilot burner assembly consists of a pilot tube 39 having burner openings 40 and a restricting orifice 41. The pilot tube 39 has an air intake port 42, the gas for the pilot flame being supplied through the conduit 43 in the casting, which is suitably connected to a source of gas (not shown). A valve disk 44 having a compressible facing 45 makes contact with the valve seat 32 to shut off the gas flow from the inlet 31 to the outlet 33 when the device is in the "off" position. The valve disk 44 and its facing 45 are arranged to slide longitudinally on the valve guide 46 and are pressed against the valve seat 32 by the spring 47. A pickup shaft 48 consists of a steel rod formed with a circular groove 49 on the inner end to provide a catch for engagement with the margin 50 of an opening through the pickup disk 51, which is held in the pickup sleeve 52. The shaft 48 is adapted to slide inside the guide 46 which is fixed to the packing nut 56. The pickup sleeve 52 is operatively connected by means of a sliding connecting tube 53 to the end 28 of the rod 24. The other end of the sleeve 52 is arranged to press against the valve facing 45 on the valve disk 44, associated therewith. The end of the pickup shaft 48 is affixed to a reset plunger 54 which is adapted to slide in the cavity of the valve cap 36, a coil spring 55 urging the plunger cap outwardly against the packing nut 56 through the packing washer 57.

When the pilot burner is in operation and the thermal-mechanical element is under relatively constant temperature, the end 28 of the rod 24 is in the position shown in Fig. 8, the sleeve 52 and its pickup disk 51 being held out of line axially with the pickup shaft 48 so that the circular groove 49 is engaged by the margin 50 of the hole in the disk 51. In this position, the sleeve 52 presses against the valve facing 45 on the valve disk 44 holding the main valve in open position against the action of the spring 47. In the event that the pilot flame is extinguished, the tube 21 of the thermal-mechanical element quickly cools and contracts causing the rod 24 to move to the right (as shown in Fig. 7) releasing the edge of the groove 49 from the margin 50 and thereby releasing the sleeve 52, thereby allowing the spring 47 to press the valve facing 45 and valve disk 44 against the valve seat 32 to close the valve. In order to reset the safety catch and to re-open the main valve, the reset plunger 54 and the attached pickup shaft 48 are pressed inwardly until the circular groove 49 is adjacent the margin 50 of the hole in the disk 51. The pilot flame is then relighted and as soon as the tube 21 has been heated sufficiently to move the rod 24 to the left (as shown in Fig. 8), the pickup shaft groove 49 engages the margin 50 of the disk 51 and when the reset plunger 54 is released, the spring 55 pulls the shaft 48 and the connected sleeve 52 presses against the valve disk 44 and the valve is opened against the action of the spring 47.

Figure 9:
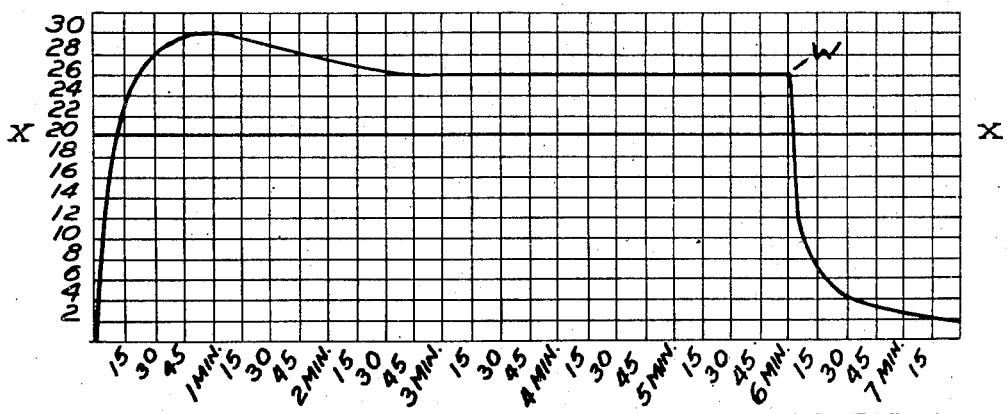
Fig. 9 is an illustrative diagram showing the relative mechanical movement of my thermal-mechanical element during a cycle of heating and cooling.

The performance of a typical thermal element of my preferred form is shown on the chart of Fig. 9, in which the lateral movement obtained at the end of the rod 6 is plotted against the time of applying a pilot flame, and the reverse movement after the flame was withdrawn at W. It will be noted that at the start, the rise of the curve is very rapid, the movement being about ten thousandths of an inch every five seconds for the first ten seconds. The element attains its maximum movement of thirty thousandths of an inch in the first forty-five seconds of heating time; after the first forty-five seconds, the performance curves shows that the rod begins to move back towards its starting position although the heat of the burner flame remains constant. This is due to the fact that the rod begins to receive conducted heat from the burner heated tube and since the rod has a thermal expansion of approximately one-half that of the tube, it causes the rod to tend to return slightly towards its starting position. Since the tube has the greater thermal expansion, the rod never fully returns. The maximum return movement or compensation takes place after from three to six minutes heating time, depending of course on the heating capacity of the pilot burner, the length of the tube 21 and of the rod 24. Another factor that tends to prevent the compensating movement from continuing, and also accelerates the return of the rod, upon cooling, to its initial starting position, is that the holding tube member 26, which is preferably made of a high heat conducting material such as copper, tends to draw away the heat from the tube 21 but has no direct effect upon the temperature of the rod 24. When the pilot burner is extinguished, at the point W, the tube begins to lose its heat both through conduction to the copper sleeve and by conduction to the surrounding air. The rod tends to hold its heat because it is enclosed and does not come in contact with the air surrounding the element and also since it has rather poor thermal conduction back to the tube or to the holding member. Due to the expansion of rod, the cooling and subsequent contraction of the tube will cause the rod to swing back to its starting point without the tube having cooled to its starting temperature, thus the element responds to a relative small change of temperature more rapidly than the actual ambient temperature. This relative small temperature drop results in a rapid return of the rod towards its starting position as can be seen from the graph; the drop in the first ten seconds being fifteen thousandths of an inch. On the graph a line XX is drawn horizontally on the line representing twenty thousandths movement. If the thermal element were arranged in a device so that after twenty thousandths of an inch movement the device would be in the "on" position, then when the thermal element returns back to the twenty thousandths of an inch point, the device would shut off. Referring to the graph, it will be noted that the "on time" in this case would be about ten seconds and the "off time" any time after three minutes heating would be about five seconds.

In cases where an exceptionally long thermal element is required, the type of construction shown in Fig. 5 may be desirable. This alternative arrangement is the same as the preferred type of Fig. 1, except that a short piece of chromium nickel (high expansion) type rod 24A is used between the tube 21 and the remainder of the rod 24B, which latter is of the low expansion type. The reason for the use of this type of construction is that due to the long length of the tube 21, the expansion may be more than is desired and due to the long length the heat is not conducted away through the holding member 26 as rapidly as in the preferred type. The pilot burner heats the tube 21 which expands causing the rod 24 to move to one side as described before. Since the long tube 21 is a fairly poor conductor of heat and the heat from the pilot burner is localized near the outer end of the tube, it takes some time for the entire tube to attain its normal operating temperature. This time lag allows the short compensator rod 24A to receive conducted heat from the tube 21 through the welded connection and as the rod begins to get hot and expand, it counteracts the increasing expansion of the tube and thus stops the movement of the thermal element at a desired maximum point. Upon the pilot flame becoming extinguished, the tube begins to cool tending the return of the rod 24B towards its starting position; the rod 24A however, holds its heat and resulting expansion because of its position where it is not directly cooled by the outside air and because it has a very poor conducting means through which to lose its heat. These two cooperating forces tend to return the rod towards its starting position very rapidly, in some cases the rod tends to swing beyond the starting position.

Still another alternative arrangement of the element may be used. The element is constructed the same as the first type described except as follows: The rod portion 24A is made of chromium low expansion steel and the rod portion 24B is made of chromium nickel high expansion type of steel. This type of element may be desirable where a long type of element is required, and where the ambient temperature condition may be rather high. The pilot burner heats the tube 21 which expands, causing the rod 24B to move as explained before. Due to the poor thermal conducting properties of the tube 21, it takes some time for the entire tube to reach its normal operating temperature; during this time the conducted heat begins to reach the rod 24B. As it expands, it tends to counteract the increasing expansion of the tube 21 and thus stops the movement of the thermal element at a desired point. Since the expansion properties of the tube and the rod portion 24B are the same, any rise in the surrounding air temperature affects both alike and therefore has very little effect upon the movement or performance of the thermal element.

Many arrangements, using different lengths for the tubes 21, the rods 24A and 24B, the length of the tongue 23 and the position and type of material used for the holder member 26, may be employed and by proper design it is possible to produce an element to give almost any desired performance under any given set of conditions. I have found, in general, that the portion of the rod near the closed end of the tube should be about one-fourth to one-third the total rod length from the holding member to the closed end of the tube.

While I have described and shown several variations of my invention, it is to be understood that these are illustrative only, and not limiting the scope of my invention.

I claim:

1. A thermal-mechanical element comprising a metallic tube one end being adapted to form a zone for exposure to temperature changes, a portion of said tube away from said exposure zone being cut to form a longitudinal tongue adapted for attachment to a central rod; a central rod of metal secured at one end to the inside of said tube at the outer end of said exposure zone, said rod also being attached to said longitudinal tongue; and said tube and said rod having different amounts of linear expansion with changes in temperature.

2. A thermo-mechanical element comprising a metallic tube having one end closed to form a zone for exposure to thermal changes, the inner end portion of said tube being cut back to form a tongue adapted to be attached to the side of a central rod; and a central rod of metal welded at one end to said tube inside said exposure zone of said tube at the closed end thereof, said rod also being welded to the end of said tongue of said tube, said central rod extending beyond said tongue weld, said rod and said tube having different coefficients of thermal expansion.

3. A thermo-mechanical element comprising a high linear expansion metallic tube having one end closed to form a zone for exposure to thermal changes, the inner end portion of said tube being cut back to form a tongue adapted to be attached to a central rod; a central rod of metal welded at one end to said tube inside said exposure zone of said tube at the closed end thereof, said rod also being welded to the end of said tongue of said tube, said central rod extending beyond said tongue weld, said rod having a low coefficient of thermal expansion in comparison with the coefficient of thermal expansion of said tube; and means for supporting said tube between said exposure zone and said tongue.

4. A thermo-mechanical element comprising a high linear expansion metallic tube having one end closed to form a zone for exposure to thermal changes, the inner end portion of said tube being cut back to form a tongue adapted to be attached to a central rod; a central rod of metal welded at one end to said tube inside said exposure zone of said tube at the closed end thereof, said rod also being welded to the end of said tongue of said tube, said central rod extending beyond said tongue weld, said rod in the portion adjacent the closed end of said tube having a coefficient of thermal expansion not less than the coefficient of expansion of said tube, and the remaining portion of said rod having a low coefficient of thermal expansion in comparison with the coefficient of thermal expansion of said tube; and means for supporting said tube between said exposure zone and said tongue.

5. A thermo-mechanical element comprising a copper tube having one end closed to form a zone for exposure to thermal changes, the inner end portion of said tube being cut back to form a tongue adapted to be attached to a central rod; a central rod of invar steel welded at one end to said tube inside said exposure zone of said tube at the closed end thereof, said rod also being welded to the end of said tongue of said tube, said central rod extending beyond said tongue weld; and means for supporting said tube between said exposure zone and said tongue.

6. A thermo-mechanical element comprising a metallic tubular holding member open at both ends, having high heat conductive qualities; a high linear expansion metallic tube disposed within and attached at one end of said member, said tube extending beyond the end of said holding member and being closed to form a zone for exposure to thermal changes, the inner end portion of said tube being cut back to form a tongue bent inwardly and adapted to be attached to a central rod; and a central rod of metal welded at one end to said tube inside said exposure zone at the outer end thereof, said rod also being welded to the end of said tongue of said tube, said central rod extending beyond said tongue weld and beyond said holding member, said rod having a low coefficient of thermal expansion in comparison with the coefficient of thermal expansion of said tube.

7. A thermo-mechanical element comprising a high linear expansion metallic tube having one end closed to form a zone for exposure to thermal changes, the inner end portion of said tube being cut back to form a tongue adapted to be attached to a central rod; a central rod of metal welded at one end to said tube inside said exposure zone of said tube at the closed end thereof, said rod also being welded to the end of said tongue of said tube, said central rod extending beyond said tongue weld, said rod in the portion adjacent the closed end of said tube having a coefficient of thermal expansion less than the coefficient of expansion of said tube, and the remaining portion of said rod having a coefficient of thermal expansion not less than the coefficient of thermal expansion of said tube; and means for supporting said tube between said exposure zone and said tongue.

HORACE DICKINSON.

REFERENCES CITED

The following references are of record in the file of this patent:

UNITED STATES PATENTS

| Number | Name | Date |
| --- | --- | --- |
| 1,581,139 | Partlow | Apr. 20, 1926 |
| 2,055,822 | Brennen | Sept. 29, 1936 |
| 2,418,867 | Burch | Apr. 15, 1947 |
| 2,420,078 | Higley | May 6, 1947 |